C. A. King,
Band Pulley.
No. 104,322. Patented June 14, 1870.
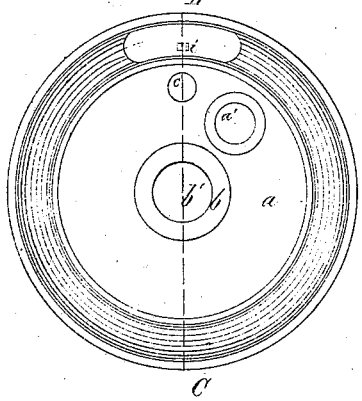
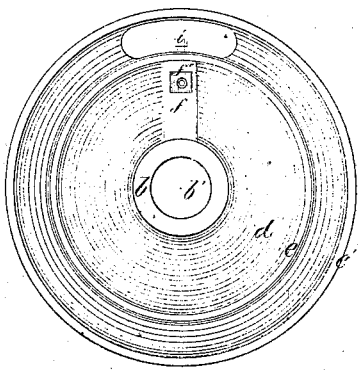
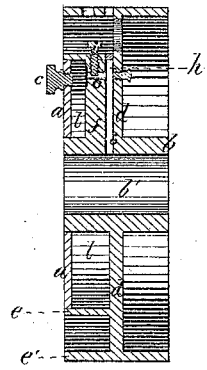
Witnesses
L. A. Curtis
C. E. Buckland
Charles A. King
Inventor

United States Patent Office.

CHARLES A. KING, OF SPRINGFIELD, MASSACHUSETTS.

Letters Patent No. 104,322, dated June 14, 1870.

IMPROVEMENT IN OILERS FOR LOOSE PULLEYS.

The Schedule referred to in these Letters Patent and making part of the same.

*To all whom it may concern:*

Be it known that I, CHARLES A. KING, of Springfield, in the county of Hampden and State of Massachusetts, have invented a new and useful Improved Oiler for Loose Pulleys; and I do hereby declare that the following is a full, clear, and exact description thereof, reference being had to accompanying drawing making a part of this specification, and to the letters of reference marked thereon, in which—

Figure 1 is a side view of a pulley, made with my invention applied;

Figure 2 is a side view of the same, with the cover of the oil-chamber removed, showing the interior of the chamber; and Figure 3 is a vertical section of the same, through line B C of fig. 1.

My invention relates to a device for lubricating the bearing of a loose pulley, and is an improvement upon the device shown in Letters Patent No. 95,912, granted to me, and dated October 19, 1869; and My invention consists in the construction and arrangement of an annular chamber and pulley, with a regulating supply-duct, and an oiling-duct and its chamber, whereby any desired quantity of oil may be drawn from the annular chamber, which is filled, or partially filled with oil, through the said ducts, and delivered to the bearing of the pulley; and after the device has been once regulated to deliver any particular or desired quantity of oil to the bearing, it will be self-operating, and continue to lubricate the bearing to the same degree, daily.

That others skilled in the art may be able to make and use my invention, I will proceed to describe its construction and the mode of its operation.

In the drawing—

$d$ represents the main part of the pulley, which connects the hub $b$ with the rim $e'$, and upon this part $d$ is cast the annular rim $e$.

A protuberance, $f$, may be made upon the main part $d$, extending wholly or partially from the rim $e$ to the hub $b$.

This protuberance is designed to furnish the necessary body or stock through which to make the oiling-duct $o'$, extending from the rim $e$ of the annular chamber, or from a point near said rim, down through the hub $b$, and may be made by drilling through from the outside of the pulley, and afterward plugging up the outer end of the hole, at the rim $e$ of the annular chamber.

The duct $o$ may be made parallel to the axis of the shaft, or to the axis of the hub $b$, or it may be made at any desired angle therewith.

I prefer the former, as it is then only necessary to drill through the part $f$, from the annular chamber to the duct $o'$.

A threaded hole is made through the rim $e$ of the annular chamber, and extending to the inner side of the duct $o$, and a screw, $i$, fitted therein, so that, when the said screw is turned in, the lower or inner end of the screw fitting against its seat, all communication from the annular chamber $l$ (fig. 3) to the duct $o'$ is cut off.

The cover $a$ of the annular chamber $l$ may be made of tin, brass, or other suitable metal, and, if desirable, and the metal is sufficiently thick, a screw-thread may be cut upon the periphery of the disk or cover, and a corresponding female screw-thread cut upon the interior of the annular chamber, and the cover may then be screwed in tightly, or it may be soldered in tightly, taking care that there shall be no leakage.

A threaded hole may be made in the cover $a$, and a threaded knob, $c$, fitted therein, and a small hole may also be made in the said cover $a$, into which may be soldered a glass, $a'$.

The operation of my invention is as follows:

The knob $c$ may be turned out, and the annular chamber filled with oil, and, if filled nearly full, the oil may be seen through the glass $a'$. The nut or knob $c$ may then be turned in tightly, and the screw $i$ may then be turned in, so that the space between the inner end of the said screw and its seat shall be very small. When the pulley is set in rapid motion, the oil in the annular chamber is caused, by the centrifugal force, to assume an annular position in the chamber, and a small quantity of the oil is forced through the duct $o$ beneath the end of the screw $i$, and is caused, by the centrifugal force, to occupy a position in the outer end of the duct $o'$, filling the chamber $h$, and the oil will thus remain in about the same position during the rapid revolution of the pulley. When the pulley revolves sufficiently slow to cause the centrifugal force to cease to operate in throwing the oil away from the shaft, the oil which has been in the chamber $h$, at the outer end of the duct $o'$, will pass down the duct $o'$ to the shaft, thus giving the bearing of the pulley the desired amount of lubrication. If too much oil should be forced through the duct $o$ into the duct $o'$, a less quantity may be used, by turning the screw $i$ in a little, said screw operating as a valve to regulate the flow of oil through the duct $o$.

A small wire screen or strainer is placed over the mouth of the duct $o$, and soldered, or otherwise properly secured thereto, as shown at $f'$, to prevent any particles of dirt from passing into the duct $o'$, and keep the oil, as it is being applied to the bearing, always as clean as possible.

By this device, all the oil that is admitted into the duct $o'$ may be used up, and none but new, fresh oil is applied to the shaft, instead of using the same oil over and over again, which, in a short time, becomes gummy and discolored, as is the case in some of the devices now in use.

I am aware that a self-oiling pulley, having the oiling-duct $o'$ therein, has been made before, as shown in the before-mentioned Letters Patent No. 95,912, granted to me; but never, to my knowledge, has a regulating-screw been used, in connection with the small communicating-duct $o$, for the purpose of regulating the supply of oil to the duct $o'$ and chamber $h$.

Having thus described my invention,

What I claim as new, and desire to secure by Letters Patent, is, as an improvement upon the device shown in said Letters Patent No. 95,912—

1. The combination of the regulating-screw $i$ with the duct $o$ and oiling-duct $o'$, all constructed and operating substantially as described.

2. The combination of the strainer $f'$ with the regulating-screw $i$ and ducts $o$ and $o'$, all constructed substantially as described, and operating to furnish a delivery of clean oil to the bearing, as set forth.

CHARLES A. KING.

Witnesses:
T. A. CURTIS,
C. E. BUCKLAND.